UNITED STATES PATENT OFFICE.

LLEWELLYN H. HUTCHINSON, OF NORTHFIELD, VERMONT, ASSIGNOR TO MARLBOROUGH W. CROSS, GEORGE A. CROSS, LEVI T. CROSS, AND JOHN A. CROSS, OF SAME PLACE.

DETERGENT COMPOUND.

SPECIFICATION forming part of Letters Patent No. 542,524, dated July 9, 1895.

Application filed April 10, 1895. Serial No. 545,222. (No specimens.)

*To all whom it may concern:*

Be it known that I, LLEWELLYN H. HUTCHINSON, of Northfield, in the county of Washington and State of Vermont, have invented certain new and useful Improvements in Cleansing Compounds for Marble, Granite, and the Like; and I do hereby declare the following to be a full, clear, and exact description of the invention, such as will enable others skilled in the art to which it appertains to make and use the same.

This invention contemplates certain new and useful improvements in cleansing compounds for granite, marble, and the like.

The object of the invention is to produce a simple and inexpensive compound for removing all acid, dirt, and iron stains, as well as all discolorations from granite or marble slabs, stones, &c.; also for cleaning monuments which, from exposure, have become dirty and mossy or stained by drippings from trees, and also cleaning the exterior of building-walls and the like.

A further object is to provide a compound which will not itself discolor the granite or marble or leave any stain thereon, and which will be entirely innocuous.

In carrying out my invention I employ the following ingredients: oxalic acid, one pound; wood alcohol, six ounces; chloride of lime, one pound; water, six ounces.

In the manufacture of this paste or compound I place the base, oxalic acid, in an earthenware bowl and then add the wood alcohol and let it stand about fifteen or twenty minutes. I then add the chloride of lime and then the water, all being mixed together until the ingredients are thoroughly dissolved and form a homogeneous mass. As thus formed the compound becomes a paste, in which form it is put up for convenient use. The paste is applied to the surface to be cleaned and allowed to remain until it becomes nearly dry, when it can easily be removed by washing with a coarse brush. In cleansing marble the paste is preferably reduced or moistened by the addition of water.

I am aware that some of the ingredients mentioned or some of the alkalies have heretofore been used in conjunction with other agencies in cleaning compounds; but I am not aware that before my invention the composition of matter herein described has been known or used as a cleaning compound for marble and granite.

It will be noted that in my compound oxalic acid constitutes the base or chief ingredient. This element and the chloride of lime constitute the cleansing agents, which in connection with the other ingredients constitute a perfectly-harmless cleansing material for stone and the like. It will quickly and effectively remove all stains, with the possible exception of oil stains, and will even draw out iron stains. This is accomplished without injury to the surface to which the paste is applied, while some of the compositions heretofore used employ such strong acids, without any counteracting agents, that the surface of the stone is stained and injured in consequence.

I claim as my invention—

The composition of matter herein-described for cleansing marble, granite and the like, consisting of oxalic acid, wood alcohol, chloride of lime and water in about the proportions stated.

In testimony whereof I have signed this specification in the presence of two subscribing witnesses.

LLEWELLYN H. HUTCHINSON.

Witnesses:
FRANK PLUMLEY,
J. M. BULLOCK.